(12) United States Patent
Mohageg

(10) Patent No.: US 9,535,212 B1
(45) Date of Patent: Jan. 3, 2017

(54) SINGLE MODE LARGE MODE AREA OPTICAL FIBER COIL

(71) Applicant: RAYTHEON COMPANY, Waltham, MA (US)

(72) Inventor: Makan Mohageg, Granada Hills, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 14/857,032

(22) Filed: Sep. 17, 2015

(51) Int. Cl.
*G02B 6/10* (2006.01)
*G02B 6/02* (2006.01)

(52) U.S. Cl.
CPC ............. *G02B 6/02009* (2013.01); *G02B 6/10* (2013.01)

(58) Field of Classification Search
CPC .................................................. G02B 6/02009
See application file for complete search history.

(56) References Cited

U.S. PATENT DOCUMENTS

| | | | | |
|---|---|---|---|---|
| 5,333,232 | A * | 7/1994 | Yanagawa | G02B 6/024 385/126 |
| 5,566,267 | A * | 10/1996 | Neuberger | C03B 37/01493 385/123 |
| 6,360,565 | B1 * | 3/2002 | Christoff | C03B 37/01217 65/403 |
| 6,904,219 | B1 | 6/2005 | Fermann | |
| 6,970,632 | B2 * | 11/2005 | Berkey | G02B 6/024 385/100 |
| 7,440,651 | B1 | 10/2008 | Savchenkov et al. | |
| 7,876,495 | B1 * | 1/2011 | Minelly | C03B 37/0122 359/341.1 |
| 7,924,500 | B1 * | 4/2011 | Minelly | G02B 6/023 359/341.1 |
| 7,983,312 | B2 * | 7/2011 | Shkunov | H01S 3/06704 372/19 |
| 8,565,272 | B2 * | 10/2013 | Shkunov | H01S 3/06704 372/6 |
| 8,705,918 | B2 * | 4/2014 | Shkunov | H01S 3/06704 385/33 |
| 8,755,660 | B1 * | 6/2014 | Minelly | C03B 37/0122 359/341.1 |
| 8,837,038 | B2 * | 9/2014 | Liu | H01S 3/06745 359/341.1 |

(Continued)

OTHER PUBLICATIONS

International Search Report and Written Opinion for PCT/US2016/041528 dated Oct. 7, 2016.

*Primary Examiner* — Rhonda Peace
(74) *Attorney, Agent, or Firm* — Lando & Anastasi, LLP

(57) ABSTRACT

An optical fiber having a large mode area for high power applications and geometrically configured for single-mode operation. One example of an optical fiber system includes a mandrill and an optical fiber helically coiled about the mandrill with a preselected bend radius. The optical fiber includes a core having a high aspect ratio elongated cross-section, wherein the core is narrower in a fast-axis direction and wider in a slow-axis direction, the core including an annular protrusion that is Gaussian in transverse cross-section and has a width in the slow-axis direction and an annular extension in the fast-axis direction, and wherein a ratio of the width, the annular extension, and the bend radius is selected for single-mode operation of the optical fiber.

14 Claims, 14 Drawing Sheets

(56) References Cited

U.S. PATENT DOCUMENTS

| | | | | |
|---|---|---|---|---|
| 9,031,099 | B2* | 5/2015 | Gapontsev | B29D 11/00721 |
| | | | | 372/6 |
| 9,140,873 | B2* | 9/2015 | Minelly | C03B 37/0122 |
| 9,322,988 | B2* | 4/2016 | Digiovanni | H01S 3/06729 |
| 2009/0041061 | A1* | 2/2009 | Shkunov | H01S 3/06704 |
| | | | | 372/6 |
| 2011/0069725 | A1* | 3/2011 | Shkunov | H01S 3/06704 |
| | | | | 372/6 |
| 2012/0076159 | A1* | 3/2012 | Shkunov | H01S 3/06704 |
| | | | | 372/6 |
| 2012/0275475 | A1* | 11/2012 | Shkunov | H01S 3/06704 |
| | | | | 372/6 |
| 2013/0011109 | A1 | 1/2013 | Shkunov et al. | |
| 2013/0142481 | A1 | 6/2013 | Rockwell et al. | |
| 2014/0314105 | A1* | 10/2014 | Gapontsev | B29D 11/00721 |
| | | | | 372/6 |
| 2015/0110452 | A1* | 4/2015 | Digiovanni | H01S 3/06729 |
| | | | | 385/124 |

* cited by examiner

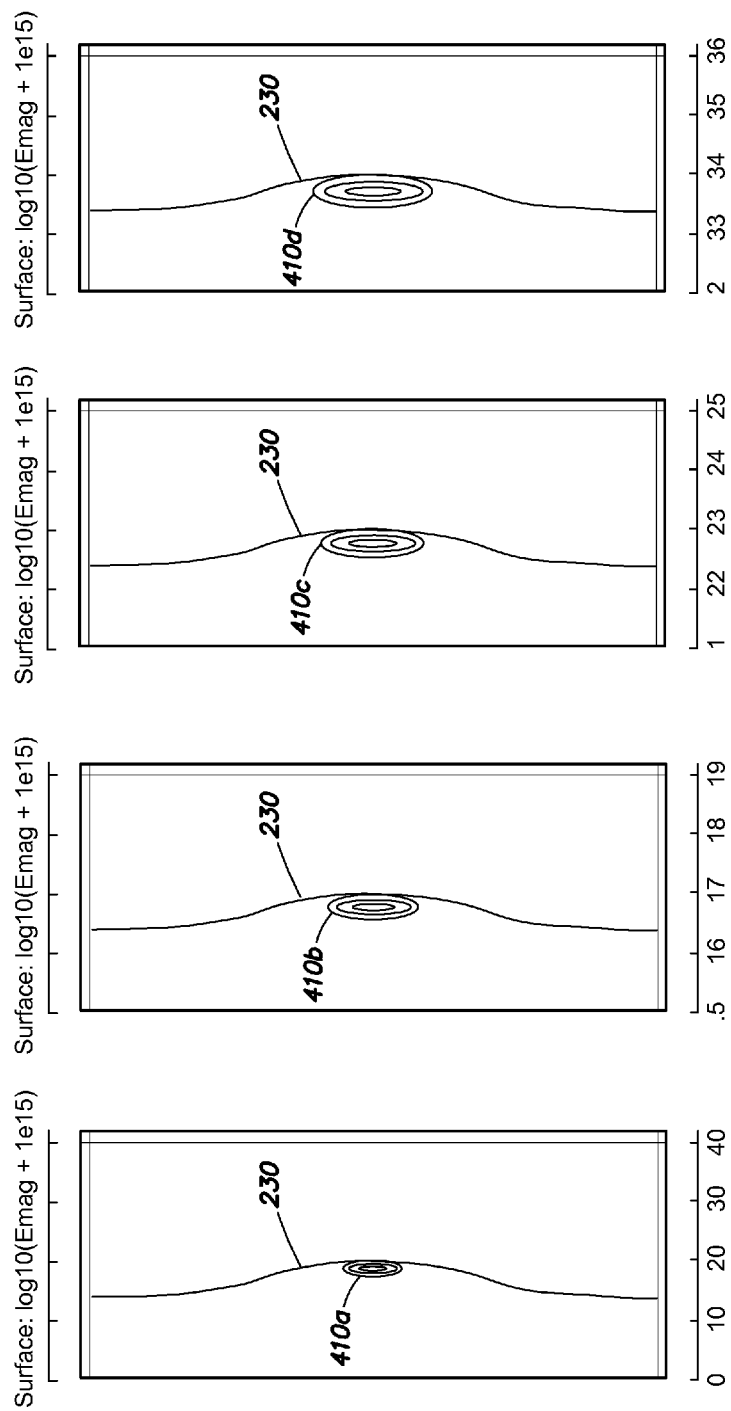

SINGLE MODE LARGE MODE AREA OPTICAL FIBER COIL

BACKGROUND

Optical fibers can be used to transmit a laser beam from a laser source to a desired location. The use of an optical fiber to transmit a laser beam from a laser source to a desired location is a significant enabler in a number of laser applications because the optical fiber offers a flexible transmission path that involves no free-space optics and which can be re-routed in real time. High power fiber lasers (e.g., having an output power in the range of about 1-10 kW or higher) are useful for a wide variety of applications, including military applications and in the industrial fields of welding, high-speed cutting, brazing, and drilling. However, the use of optical fibers for delivery of laser beams from high power fiber lasers has been limited by numerous challenges. For example, a significant limitation to the use of high-power fiber lasers in industrial applications is power loss due to non-linear effects, such as stimulated Brillouin scattering (SBS) or stimulated Raman scattering (SRS), as the beam propagates through the delivery fiber from the fiber laser source to the work area.

To reduce degradation of the laser beam by these non-linear effects and accommodate high peak or average power, conventional optical fibers have a large core area, for example having core diameters as large as 0.5 to 1 mm, and large numerical aperture (NA), for example, in the range of 0.1-0.2. As a result, these conventional fibers are highly multi-mode. Due to the multimode aspect of these conventional optical fibers, bending of the optical fibers results in a strong mode coupling to the higher order transverse electromagnetic modes that are guided along with the fundamental and other lowest order transverse electromagnetic modes. If the lowest-order transverse electromagnetic mode is launched in these conventional optical fibers, the lowest-order mode will lose most of its power as it feeds higher-order transverse electromagnetic modes. As a result, even if the input beam is nearly diffraction-limited and the output beam suffers only minor power loss, the output beam quality is typically greater than 50-100 times diffraction limited (XDL). Therefore, these conventional optical fibers can meet power-delivery requirement, but not beam-quality delivery requirements.

To overcome the above deficiency with high beam quality transportation, a large mode area (LMA) optical fiber design can be implemented. LMA optical fibers can guide a few higher-order transverse electromagnetic modes while still maintaining beam quality at or better than approximately 1.3 times diffraction-limited (XDL). An LMA optical fiber differs from the standard large-core delivery fibers by having a relatively small core diameter, between about 20 μm and about 30 μm for signal wavelengths of about 1 μm, and a reduced NA of approximately 0.06. Generally, LMA fibers must be properly coiled to maintain good beam quality. In particular, for LMA fibers, a mode-dependent loss may be created by forming the fiber laser into a coil with a predetermined bend radius. Coiling imposes radiation losses that are highly dependent on mode order, with the loss rate increasing rapidly with increasing mode order. Hence, using a proper coiling radius the higher-order modes can be stripped out leaving only the lower-order modes, thereby "cleaning up" the laser beam. However, even though proper coiling can reduce the number of supported higher-order modes, LMA fibers cannot generally be made to operate only in a single mode operation (i.e., with the optical energy substantially in the fundamental fiber mode while having relatively small or negligible optical energy in higher fiber modes), as is desired in many applications, at least in part because the numerical aperture required for single-mode operation at large core sizes is lower than can be reliably achieved. For conventional LMA fibers having relatively large core diameter (e.g., exceeding 50 μm), as may be necessary for very high power applications, mode discrimination via coiling becomes inadequate between the increased number of competing modes and the diminishing separation in loss rates between neighboring modes to reliably select the lowest-order mode while operating at a low transmission loss.

SUMMARY OF INVENTION

Aspects and embodiments are directed to a single mode large mode area (LMA) optical fiber capable of handling continuous wave (CW) power in excess of 1 kW without nonlinearity. Such optical fibers may be useful in a wide variety of applications. For example, such fibers can be used as a gain element in high power fiber laser applications. Such fibers can also be used as transmission lines for high order QAM optical communication channels.

According to one embodiment, a single-mode large mode area (LMA) optical fiber that is helically coiled with a preselected bend radius comprises a core having a high aspect ratio elongated cross-section and having a first refractive index, wherein the core is narrower in a fast-axis direction and wider in a slow-axis direction, the core including an annular protrusion that is Gaussian in transverse cross-section, and wherein a width of the annular protrusion in the slow-axis direction, an annular extension of the annular protrusion in the fast-axis direction, and the bend radius are selected for single-mode operation, and a cladding surrounding the core, the cladding having a second refractive index different than the first refractive index.

In one example of the optical fiber the core has a relatively large area selected so as to raise a threshold of stimulated Raman scattering or stimulated Brillouin scattering, or both. In one example the annular extension of the annular protrusion in the fast-axis direction is in a range of approximately 2-6 μm. In another example the bend radius is in a range of approximately 10-15 cm.

A material of the core can be one of quartz, fused silica, and doped glass, for example. The cladding can be air or glass, for example.

In one example the optical fiber of is configured to transmit a laser beam having a power greater than or equal to about 10 kW.

According to another embodiment, an optical fiber system comprises a mandrill, and an optical fiber helically coiled about the mandrill with a preselected bend radius, the optical fiber including a core having a high aspect ratio elongated cross-section, wherein the core is narrower in a fast-axis direction and wider in a slow-axis direction, the core including an annular protrusion that is Gaussian in transverse cross-section and has a width in the slow-axis direction and an annular extension in the fast-axis direction, and wherein a ratio of the width, the annular extension, and the bend radius is selected for single-mode operation of the optical fiber.

In one example the mandrill is metal. The mandrill can include, or have circulated therein, a cooling fluid.

In one example the optical fiber further includes a cladding surrounding the core. The cladding can be air or glass, for example. In one example the core has a first refractive index and the cladding has a second refractive index, a difference between the first and second refractive indexes selected so as to achieve total internal reflection of at least one wavelength of light guided in the optical fiber. The material of the core can be one of quartz, fused silica, and doped glass, for example.

In one example the annular extension of the annular protrusion in the fast-axis direction is in a range of approximately 2-6 µm. In another example the bend radius is in a range of approximately 10-15 cm.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIGS. 4A-4D are mode field distribution energy diagrams showing changing mode area with increasing bend radius;

DETAILED DESCRIPTION

Figure 1:
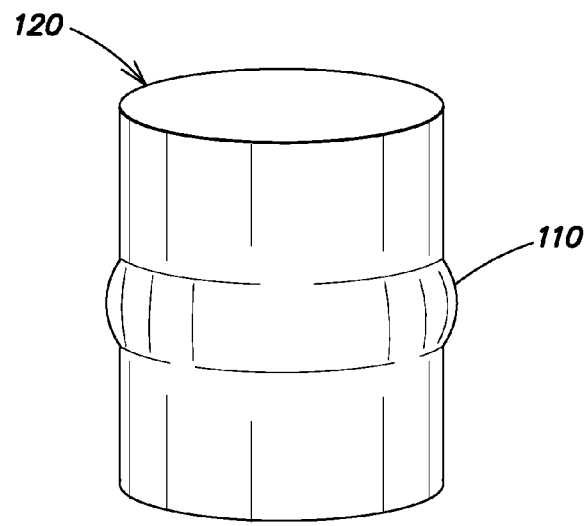
FIG. 1 is a diagram illustrating a dielectric cylinder having a ridge-like protrusion.

Aspects and embodiments are directed to optical fiber geometries that can completely eliminate higher order modes from extremely large mode area optical fibers.

As discussed above, conventional LMA fibers have a large, low numerical aperture core that supports a few modes. However, the existence of even a few higher-order-modes has negative impacts on both spatial beam quality and temporal pulse quality. To the first degree of approximation, the beam quality of a LMA fiber is directly proportional to the content of higher-order modes present in the fiber. As discussed above, coiling of the LMA fiber can reduce the undesired energy coupling to the higher order modes, but in certain cases coiling is insufficient to achieve single-mode operation, particularly for fibers having a large core diameter.

Conventional single mode fibers can in theory be adapted to provide a large effective mode area. To obtain single-mode guidance despite a large mode area, the numerical aperture of the optical fiber is decreased, i.e., the refractive index difference between the core and the cladding is reduced. However, as the numerical aperture decreases the guidance of the fiber weakens and significant losses can arise from small imperfections of the fiber or from bending. Moreover, the fiber may no longer strictly propagate in single-mode, as some higher-order modes may also propagate with relatively small losses. In some conventional examples, to minimize multi-mode propagation and strengthen the guidance of the fiber, specially optimized refractive index profiles are used, which allow a somewhat better compromise between robust guidance and large mode area. Nevertheless, large mode area single mode fibers have typically been limited to an effective mode area of about 615 µm$^2$ (28 µm mode field diameter).

Aspects and embodiments are directed to optical waveguide geometries that can be used to achieve LMA optical fibers that are single-mode and have very large mode areas, significantly larger than achieved in conventional LMA fibers. The large mode area allows for very high power optical transmission with minimal beam quality degradation due to non-linearities. As discussed further below, because the waveguide designs disclosed herein are determined by ratios of the waveguide dimensions and not, as in the case of conventional step index waveguides, absolute dimensions, the designs are advantageously scalable to small or large devices.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

A ridge-like protrusion 110 on an otherwise uniform dielectric cylinder 120, as shown in FIG. 1, for example, can support a rarified spectrum of resonant whispering gallery modes. "Whispering gallery" modes refer to the resonance condition where light travels around the inside of the structure and returns to the starting point with a $2\pi$ phase shift. Under particular geometric conditions, the spectrum of modes reduces to one mode per free spectral range. This is the "single mode resonator" regime. In particular, if the dimensions of the protrusion or ringlet 110 are correct and balanced with those of the cylinder 120, the optical resonances will be rarified.

Figure 2:
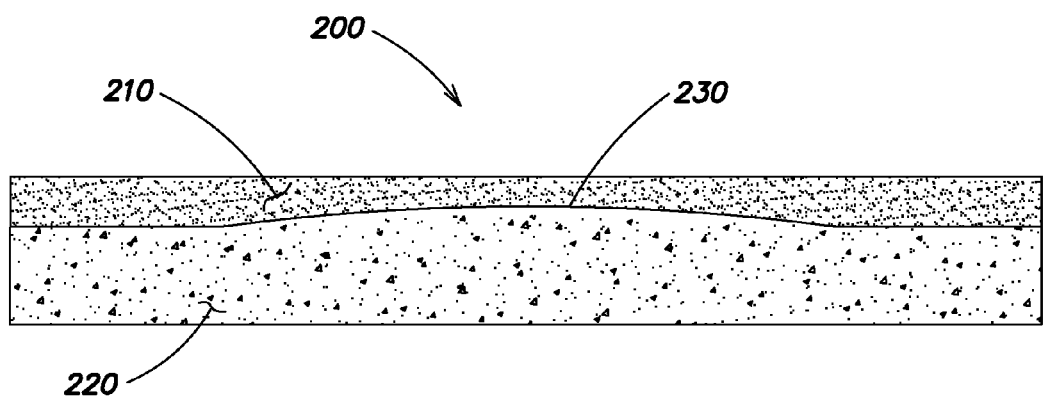
FIG. 2 is a schematic diagram illustrating one example of an optical fiber, shown in transverse cross-section, according to aspects of the present invention.

According to certain aspects and embodiments, this concept can be applied to an optical fiber to geometrically induce single-mode operation in the fiber and produce a large mode are, single mode optical waveguide suitable for high power laser applications. In one embodiment, the waveguide 210 has a shape that, in cross-section, appears to include a Gaussian hump. FIG. 2 is a cross-sectional diagram of one example of an optical fiber 200 in accord with this embodiment. The fiber 200 includes a cladding region 210 and a core region 220. The core can have relatively large area selected so as to raise a threshold of stimulated Raman scattering or stimulated Brillouin scattering, or both. The core region 220 includes a Gaussian shaped protrusion 230. Out of the cross sectional plane, the waveguide is bent around a cylindrical axis. This forms a helix. By virtue of purely geometric properties of the fiber 200, namely the width and height of the Gaussian protrusion 230, and the bend radius of the helix, the mode structure of the fiber modes supported in the core 220 is rarified. Within certain ratios of those three geometric properties, only a single propagating mode remains. Thus, the dense spectrum of waveguide modes is replaced by a single propagating, non-resonant whispering gallery mode. This is the geometrically induced "single mode regime." Because this approach is driven by ratios of dimensions and not, as in the case of conventional step index waveguides, absolute dimensions, the concept is scalable to small or large devices. As demonstrated in several examples discussed below, this configuration can be used to achieve an optical fiber or other optical waveguide that is step index (i.e., the cladding and the core materials have different refractive indexes to achieve guiding of the optical energy by total internal reflection) and single-mode with nearly arbitrary mode area.

Figure 3A:
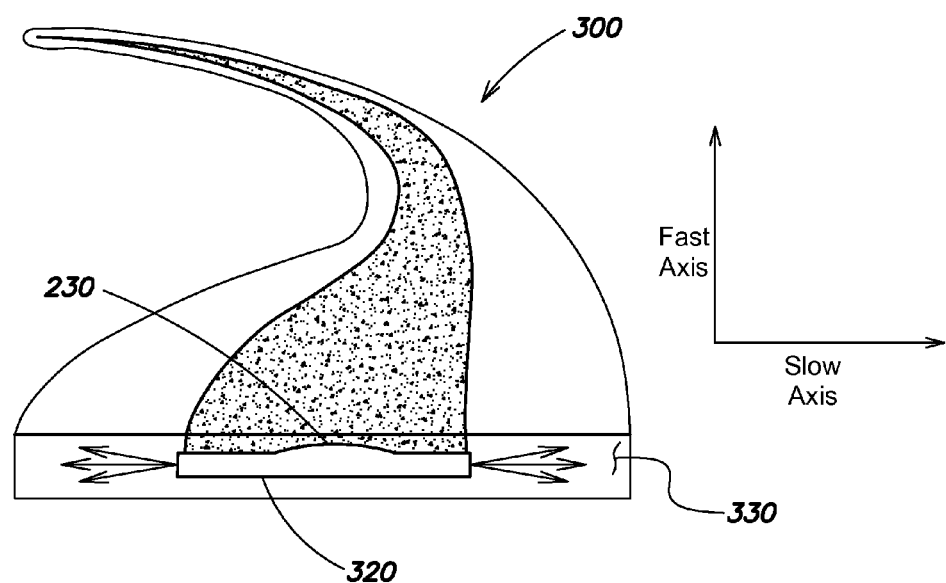
FIG. 3A is a simplified schematic diagram of a transverse cross-sectional view of one example of an optical fiber according to aspects of the present invention.
Figure 3B:
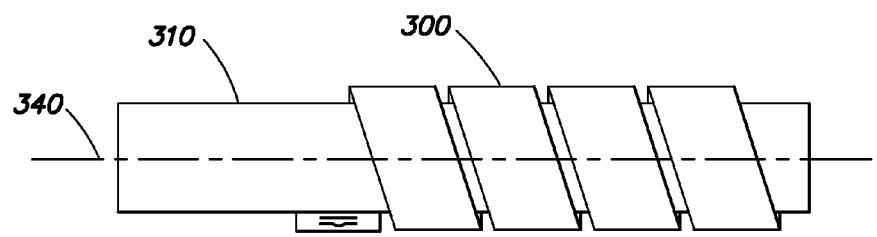
FIG. 3B is a simplified schematic diagram showing the optical fiber of FIG. 3A coiled around a cylinder, according to aspects of the present invention.

FIG. 3 is a simplified schematic diagram of one example of an optical fiber in which the techniques according to aspects and embodiments disclosed herein can be applied. In this example the fiber 300 is a semi-guiding, high aspect-ratio core (SHARC) LMA fiber configured for single-mode operation. A detailed description of examples of the SHARC architecture can be found in commonly-owned U.S. Pat. No. 7,983,312 titled "Method and Apparatus for Generation and Amplification of Light in a Semi-Guiding High Aspect Ratio Core Fiber," which is incorporated herein by reference in its entirety. The fiber 300 has a ribbon-like geometry which allows the fiber to be coiled in a spiral conformation around a carrier or mandrill 310, as shown in FIG. 3B. The fiber 300 includes a thin, doped, high aspect-ratio core 320 (in certain examples, the width can exceed the core thickness by a factor greater than 50), buried inside a flexible ribbon-like cladding 330. For a high aspect-ratio core, the coordinate along the expanded dimension is traditionally referred to as the slow axis, while the narrow dimension is denoted the fast axis. The slow-axis and fast-axis are shown in FIG. 3A. The cross-sectional area of the expanded core is specified to maintain a constant and safe intensity level as the total beam power is increased. The damage-limited output power increases proportionally to the increase of the slow-axis core dimension. The use of a planar structure for the fiber core 320 allows for an increase in the core cross-sectional area, and therefore output power, without a corresponding increase in the signal intensity. If desired, the cladding 330, or any outer protective coatings (not shown) can maintain a circular outer shape even for a high-aspect ratio planar core 320. The core 320 includes a Gaussian protrusion 230, as discussed above.

Various materials can be used to construct the fiber 300. In addition, embodiments of the single mode LMA optical fiber according to aspects disclosed herein can be packaged in a variety of ways. In certain examples, the fiber 300 is made from optical glass, and the cladding 330 includes a glass foil; however, a wide variety of other materials can be used. Various different glass materials, including silica and phosphate glasses, can be used. For lasing applications, the core material can be a lasing material or doped glass (e.g., doped with Ytterbium, Erbium, Thulium, Holmium, or any rare earth or alkali). For passive applications, the core material can be quartz, fused silica, or doped glass to achieve specific refractive properties, for example. In certain examples an air-cladding design can be used to couple pump light into the fiber via evanescent coupling through distributed prisms or secondary waveguides. In other examples light can be coupled into the fiber 300 through polished end faces, as will be appreciated by those skilled in the art.

As shown in FIG. 3B, the fiber is helically wound around the mandrill 310. The mandrill 310 is cylindrical and has a central longitudinal axis 340. It is preferable that the mandrill 310 has a stable or consistent shape along its length because the diameter of the mandrill sets the bend radius, R, of the fiber 300, which as discussed above and further below, is one of the geometric dimensions used to achieve single-mode operation of the fiber. The fiber 300 is coiled about the mandrill 310 in such a manner that the protrusion 230 is aligned to point away from the central axis 340. As can be seen with reference to FIGS. 4A-D, as the bend radius, R, increases, the modal density, M, decreases, and the spot size 410a-d of the fundamental waveguide guided mode (WGM) increases. FIG. 4A illustrates an example in which R=10 μm and M=103. FIG. 4B illustrates an example in which R=160 μm and M=25. FIG. 4C illustrates an example in which R=230 μm and M=6. FIG. 4D illustrates an example in which R=340 μm and M=1. The properties of the fiber other than the bend radius (e.g., the dimensions of the protrusion 230, the wavelength of the guided light, and the materials of the core and cladding) are the same for FIGS. 4A-D.

In certain examples the fiber 300 can be bonded to a metal (e.g., copper) mandrill 310. "Quadrupole" or other advanced winding techniques can be employed to reduce noise. In certain examples, the mandrill 310 can be flooded with a coolant, or a coolant can be circulated through the mandrill 310 for cooling the fiber 300 during operation.

Figure 5:
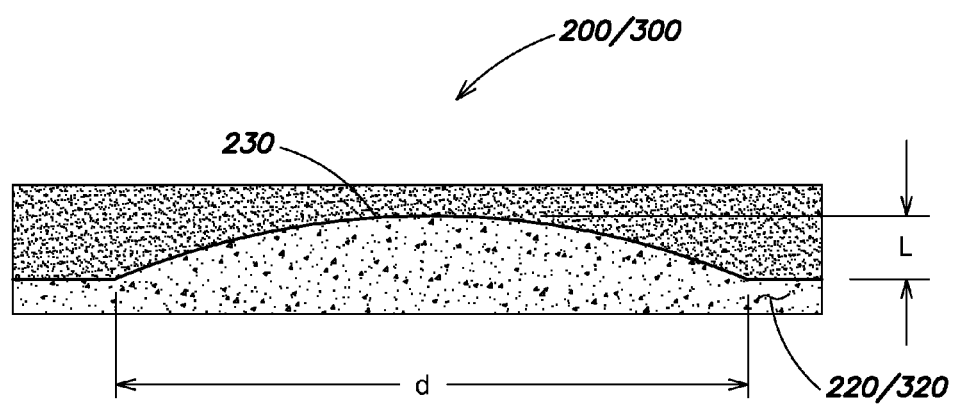
FIG. 5 is a schematic diagram illustrating an example of an optical fiber including an annular protrusion on the core, according to aspects of the present invention.

Referring to FIG. 5, there is illustrated a simplified schematic diagram showing the dimensions of the protrusion 230 of the fiber used to achieve single-mode operation. The single-mode condition is defined by Equation (1):

$$2 > \frac{d}{\lambda} n \sqrt{2 \frac{L}{R}} > 1 \quad (1)$$

In Equation (1), d is the width of the protrusion 230, shown in FIG. 5, L is the maximum height, or central annular extension, of the protrusion 230, also shown in FIG. 5, λ is the wavelength of the optical energy being guided in the fiber 300, R is the bend radius of the fiber coil, and n is the index of refraction of the core material. Based on Equation (1), for an example in which d=450 μm, λ=1550 nm, n=1.4457, and R=10 cm, single-mode operation can be achieved if the Gaussian protrusion is designed with dimension 2.2 μm<L<570 nm. Numerical calculations can be applied to achieve an optimal design solution based on these dimensions.

Thus, aspects and embodiments provide a geometric design technique by which to achieve a single-mode LMA optical fiber. As demonstrated in the examples below, embodiments of the single-mode LMA fiber can have very high mode area, making them suitable for very high power applications.

EXAMPLES

The function and advantages of these and other embodiments will be more fully understood from the following simulation examples. The examples are intended to be illustrative in nature and are not to be considered as limiting the scope of the devices, systems and methods discussed herein. In each simulation example discussed below, the simulated optical fiber had the construction shown in FIGS. 2 and 5. In each example, the wavelength used was λ=1550 nm.

Example 1

Multimode Comparative Example

Figure 6A:
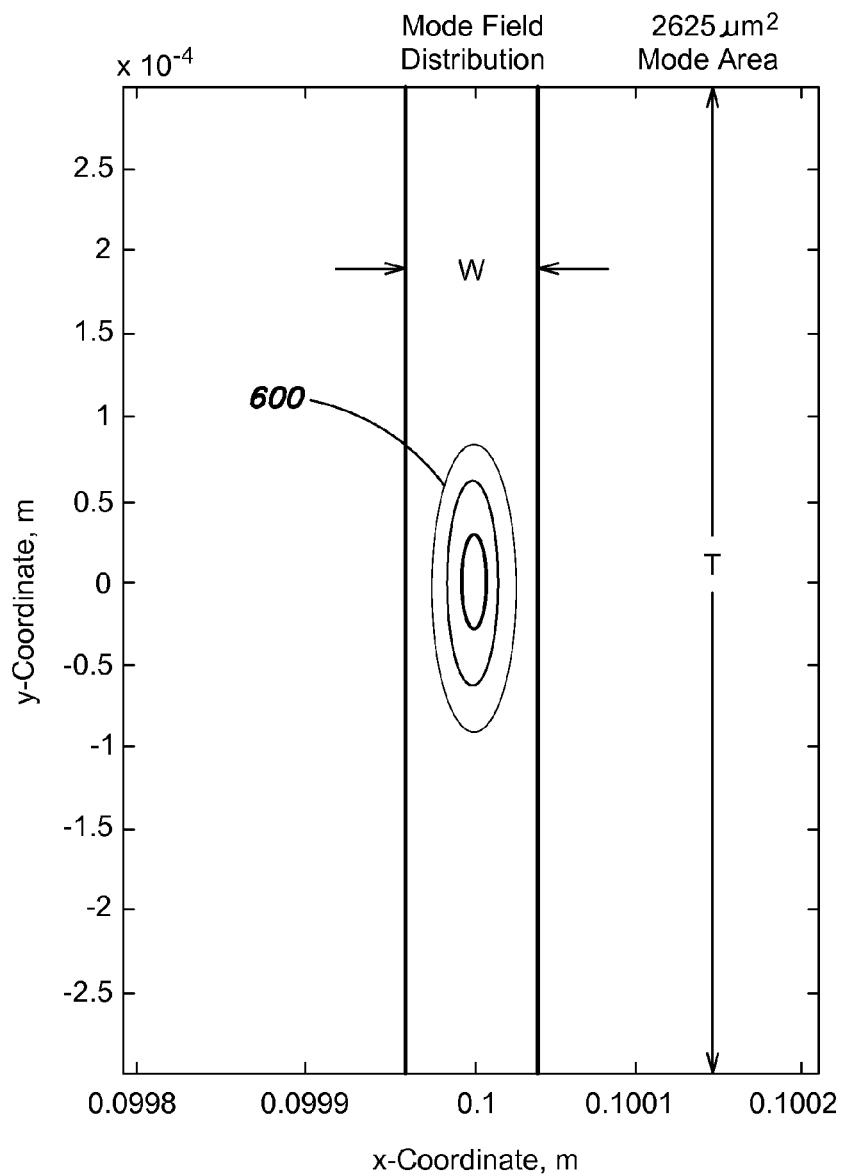
FIG. 6A is a graph illustrating mode field distribution for a first comparative example of a simulated multi-mode fiber.
Figure 6B:
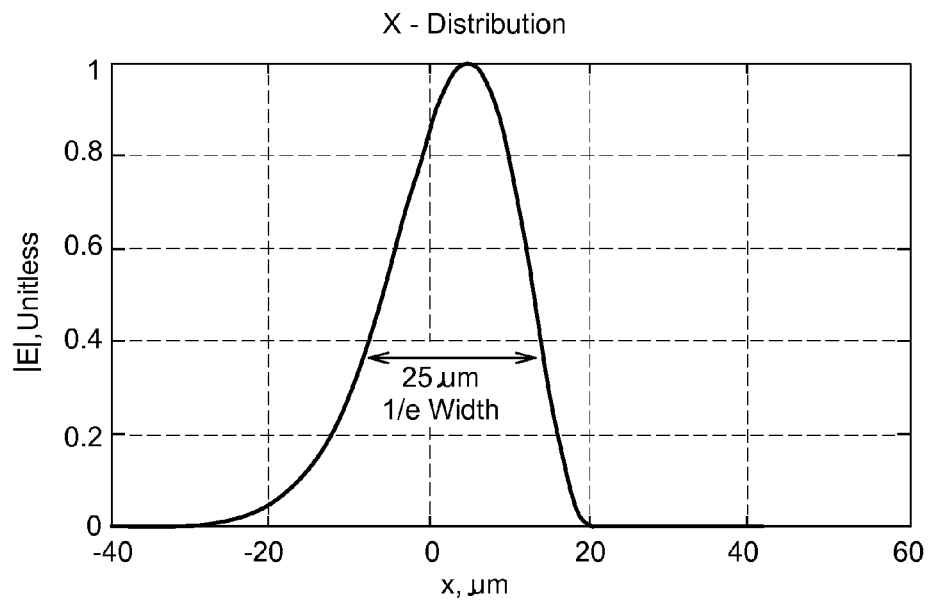
FIG. 6B is a graph showing the distribution of the magnitude of the optical energy, |E|, in the x-dimension for the comparative example of FIG. 6A.
Figure 6C:
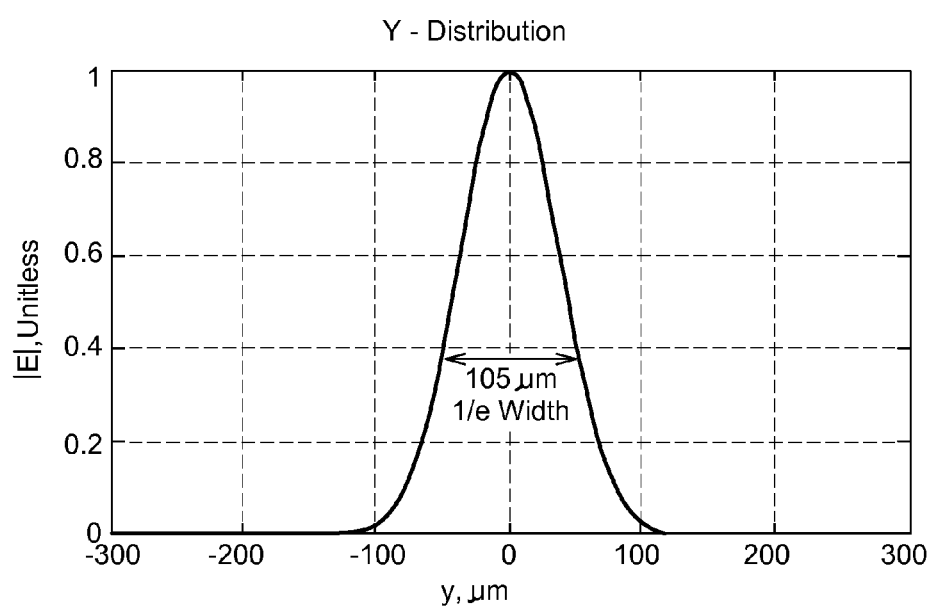
FIG. 6C is a graph showing the distribution of the magnitude of the optical energy, |E|, in the y-dimension for the comparative example of FIG. 6A.

FIG. 6A is a graph illustrating mode field distribution for a first comparative example of a simulated multi-mode fiber. FIG. 6B shows the distribution of the magnitude of the optical energy, |E|, in the x-dimension, and FIG. 6C shows the distribution of the magnitude of the optical energy, |E|, in the y-dimension.

In this example, the fiber has height in the y-dimension (corresponding to the slow axis, as discussed above) of T=0.6 mm, and a width in the x-dimension (corresponding to the fast axis, as discussed above) of W=80 μm. The protrusion 230 has an annular extension L=6.0 μm. In this example, the bend radius is R=10 cm, and the core thickness is 60 μm. The mode area, determined by the spot size 600, and defined as $1/e^2$ power is 2625 μm².

This fiber has a modal density (number of modes supported) of M=6. Thus, this comparative example has large mode area, but is multimode.

Example 2

Single-Mode Design Example

Figure 7A:
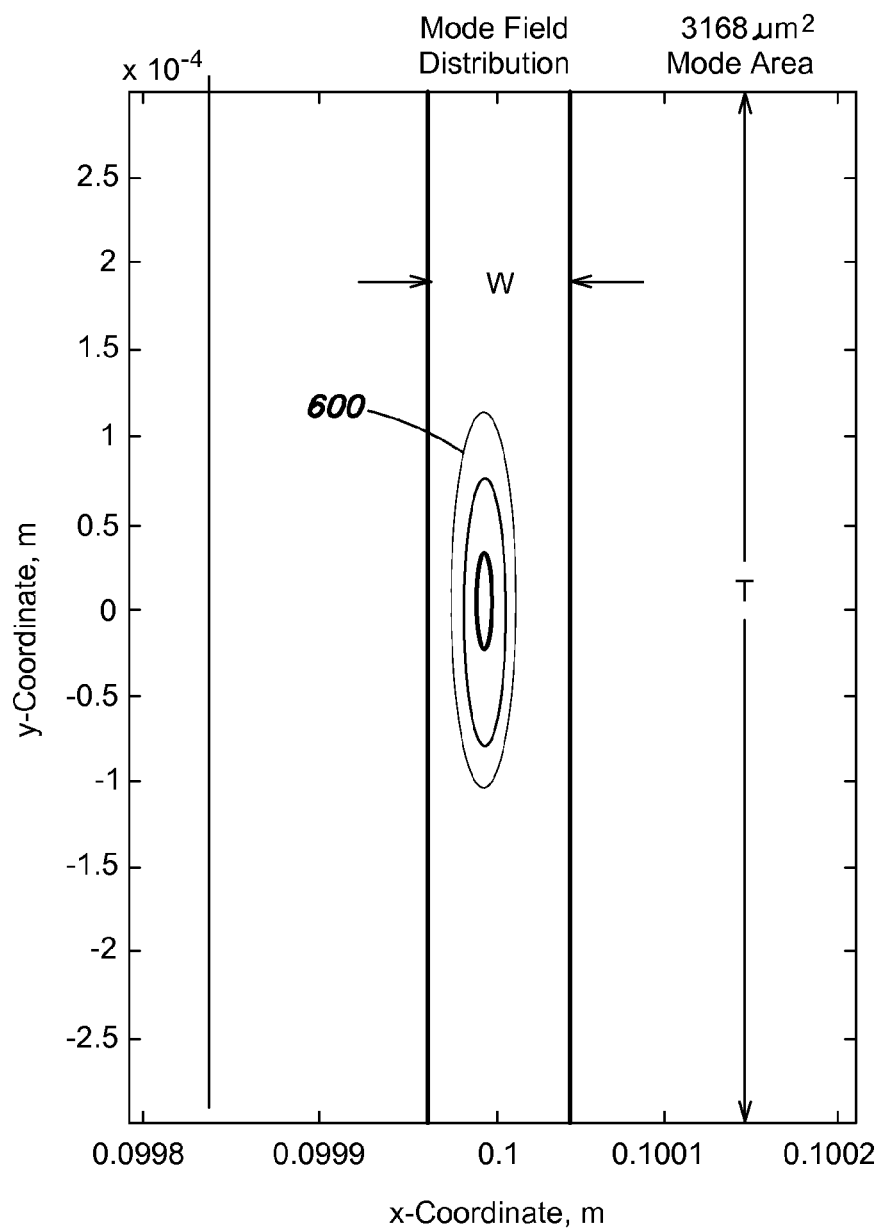
FIG. 7A is a graph illustrating mode field distribution for a first design example of a simulated single-mode fiber according to aspects of the present invention.
Figure 7B:
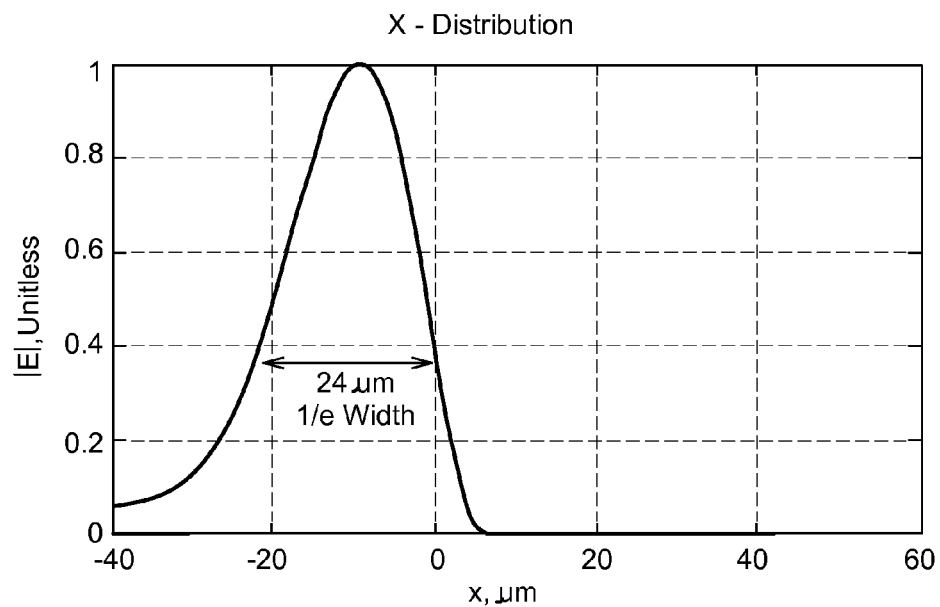
FIG. 7B is a graph showing the distribution of the magnitude of the optical energy, |E|, in the x-dimension for the design example of FIG. 7A.
Figure 7C:
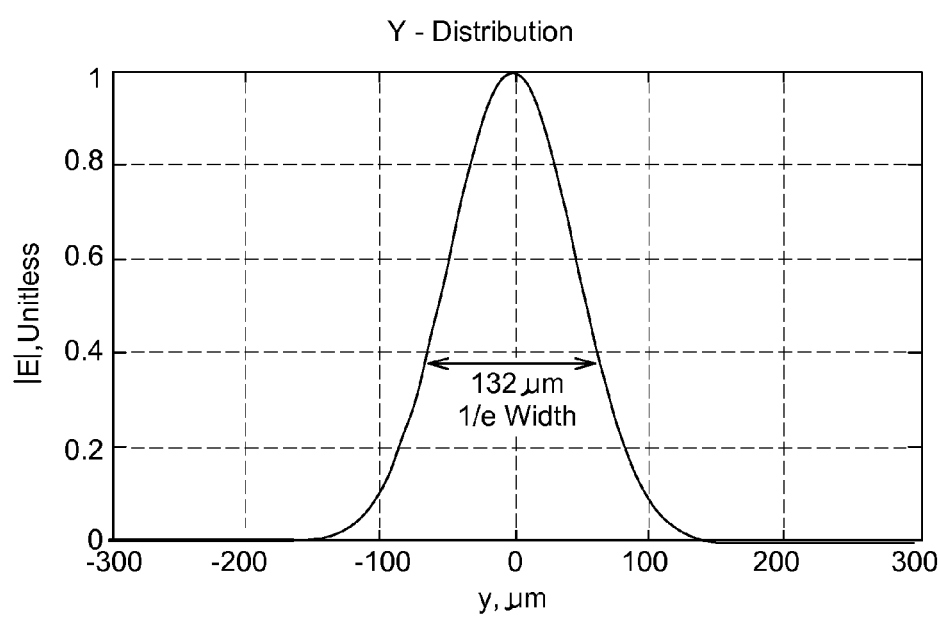
FIG. 7C is a graph showing the distribution of the magnitude of the optical energy, |E|, in the y-dimension for the design example of FIG. 7A.

FIG. 7A is a graph illustrating mode field distribution for an example of a simulated single-mode LMA fiber according to one embodiment. FIG. 7B shows the distribution of the magnitude of the optical energy, |E|, in the x-dimension, and FIG. 7C shows the distribution of the magnitude of the optical energy, |E|, in the y-dimension.

In this example, the fiber has height in the y-dimension of T=0.3 mm, and a width in the x-dimension of W=80 μm. The protrusion 230 has an annular extension L=2.0 μm. In this example, the bend radius is R=10 cm, and the core thickness is 60 μm. The mode area is 3168 μm².

In this example, the fiber has a modal density of M=1, and is thus single-mode. Additionally, the fiber has a larger mode area than the fiber of comparative Example 1.

Example 3

Multimode Comparative Example

Figure 8A:
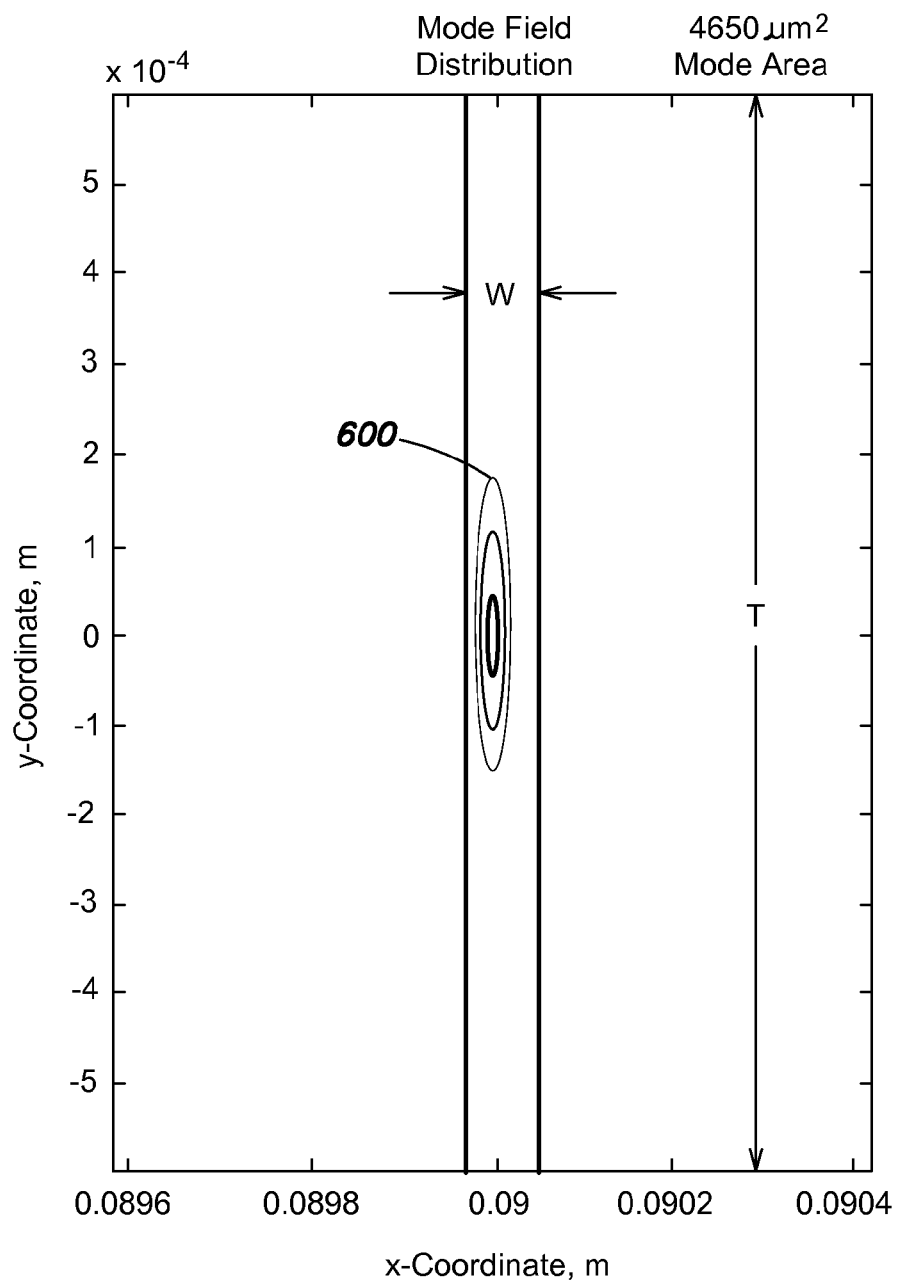
FIG. 8A is a graph illustrating mode field distribution for a second comparative example of a simulated multi-mode fiber.
Figure 8B:
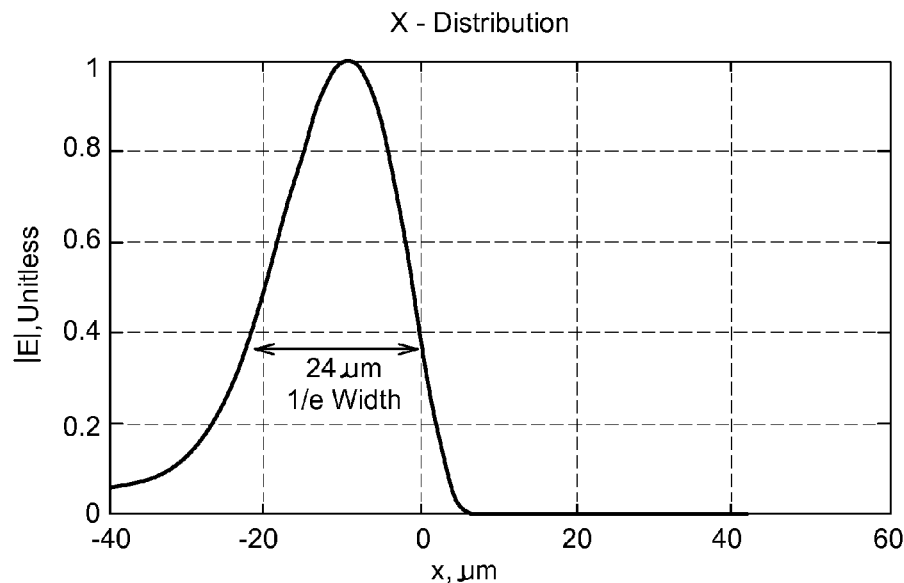
FIG. 8B is a graph showing the distribution of the magnitude of the optical energy, |E|, in the x-dimension for the comparative example of FIG. 8A.
Figure 8C:
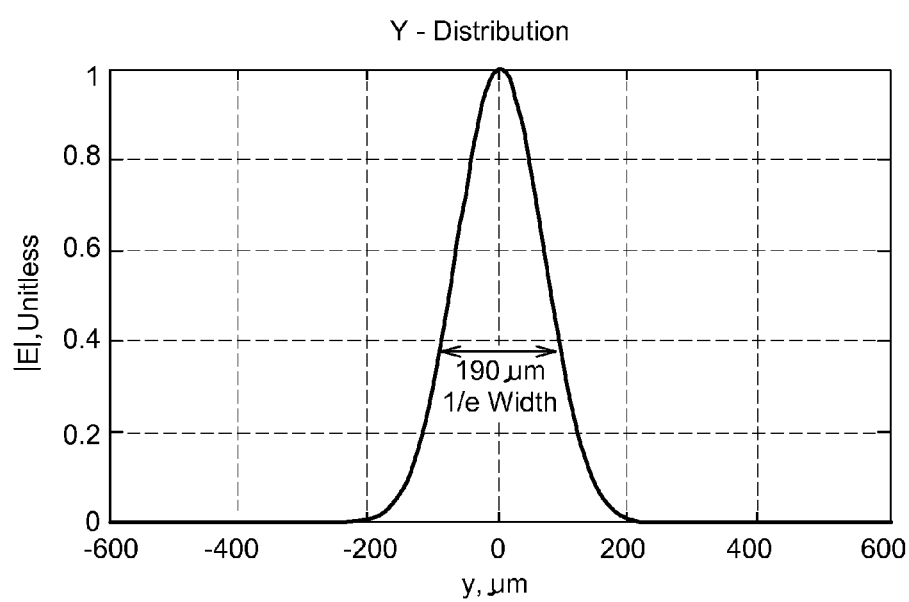
FIG. 8C is a graph showing the distribution of the magnitude of the optical energy, |E|, in the y-dimension for the comparative example of FIG. 8A.

FIG. 8A is a graph illustrating mode field distribution for a second comparative example of a simulated multi-mode fiber. FIG. 8B shows the distribution of the magnitude of the optical energy, |E|, in the x-dimension, and FIG. 8C shows the distribution of the magnitude of the optical energy, |E|, in the y-dimension.

In this example, the fiber has height in the y-dimension of T=1.2 mm, and a width in the x-dimension of W=80 μm. The protrusion 230 has an annular extension L=2.0 μm. In this example, the bend radius is R=10 cm, and the core thickness is 60 μm. The mode area is 4650 μm².

This fiber has a modal density (number of modes supported) of M=6. Thus, this comparative example has a very large mode area, but is multimode.

Example 4

Single-Mode Design Example

Figure 9A:
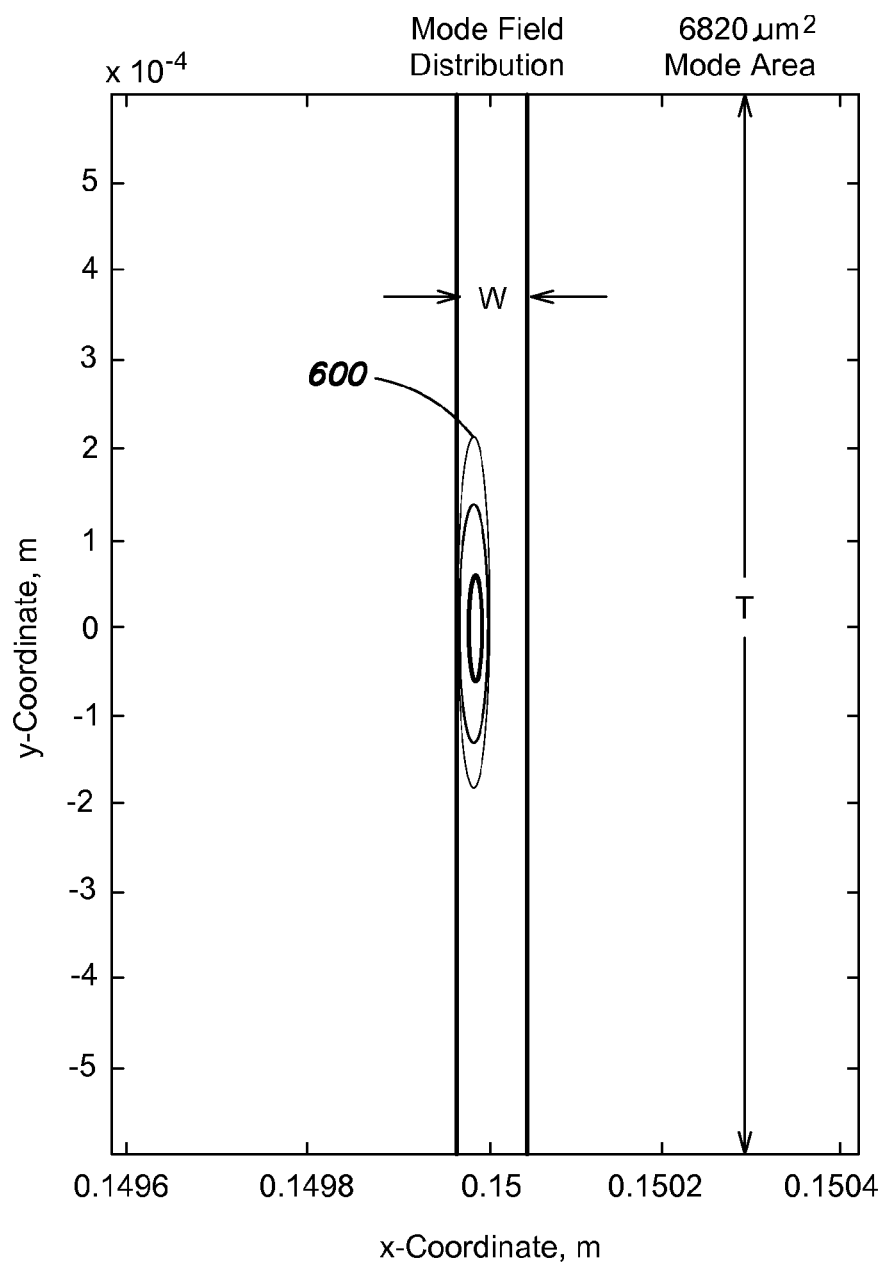
FIG. 9A is a graph illustrating mode field distribution for a another design example of a simulated single-mode fiber according to aspects of the present invention.
Figure 9B:
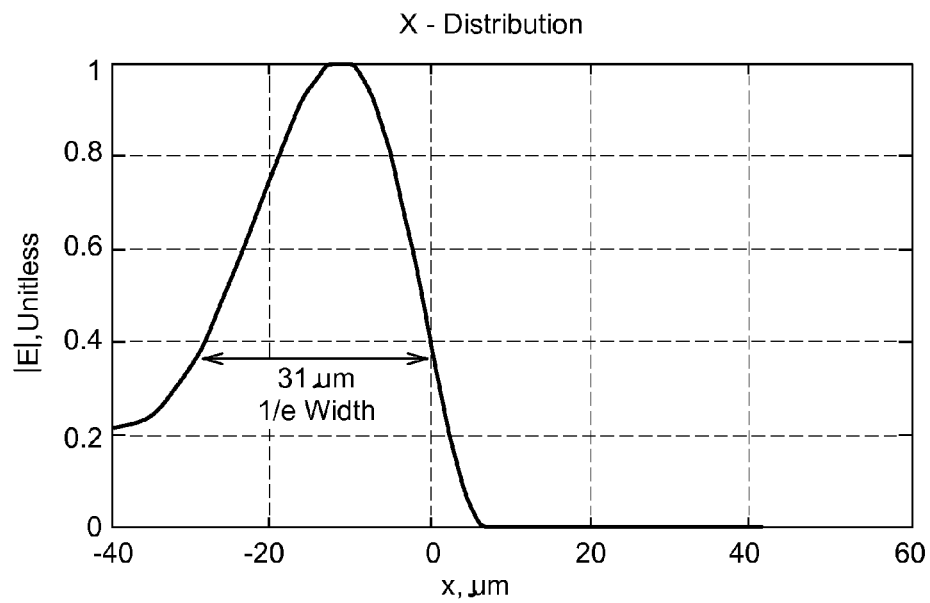
FIG. 9B is a graph showing the distribution of the magnitude of the optical energy, |E|, in the x-dimension for the design example of FIG. 9A.
Figure 9C:
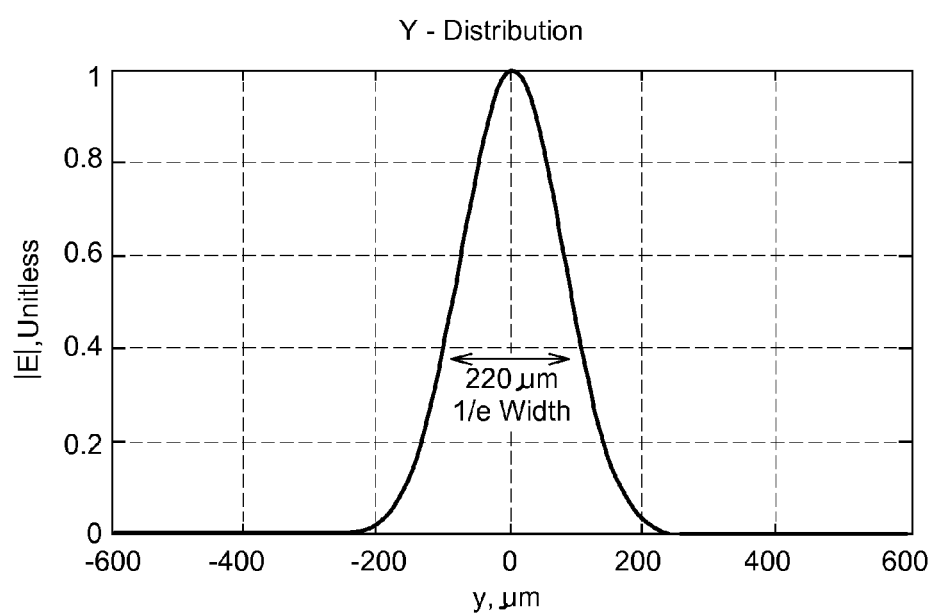
FIG. 9C is a graph showing the distribution of the magnitude of the optical energy, |E|, in the y-dimension for the design example of FIG. 9A.

FIG. 9A is a graph illustrating mode field distribution for an example of a simulated single-mode LMA fiber according to another embodiment. FIG. 9B shows the distribution of the magnitude of the optical energy, |E|, in the x-dimension, and FIG. 9C shows the distribution of the magnitude of the optical energy, |E|, in the y-dimension.

In this example, the fiber has height in the y-dimension of T=1.2 mm, and a width in the x-dimension of W=80 μm. The protrusion 230 has an annular extension L=2.0 μm. In this example, the bend radius is R=15 cm, and the core thickness is 60 µm. An air cladding was used for the simulation. The mode area is 6820 µm².

In this example, the fiber has a modal density of M=1, and is thus single-mode. Additionally, the fiber has a larger mode area than the fiber of comparative Example 3.

Example 5

Single-Mode Design Example

Figure 10A:
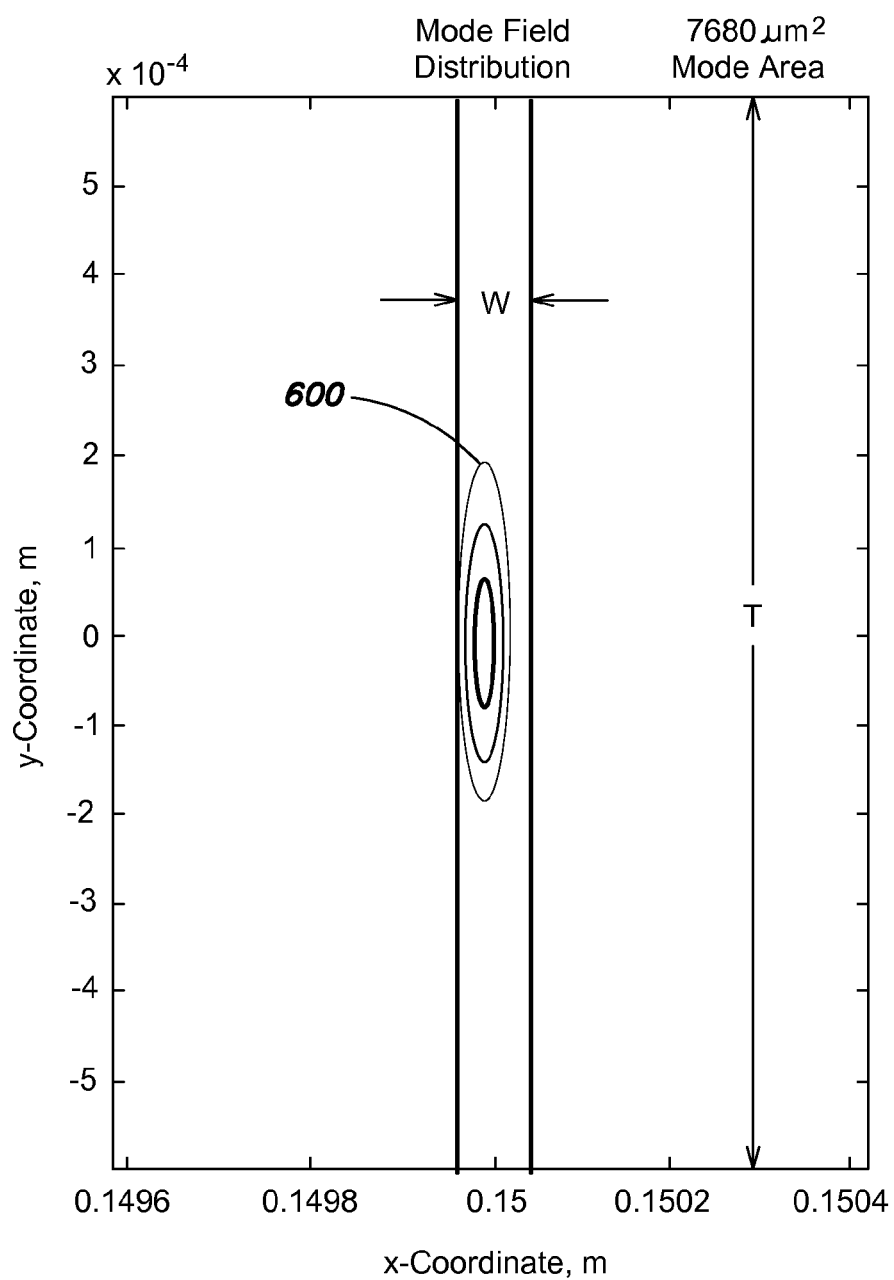
FIG. 10A is a graph illustrating mode field distribution for a another design example of a simulated single-mode fiber according to aspects of the present invention.
Figure 10B:
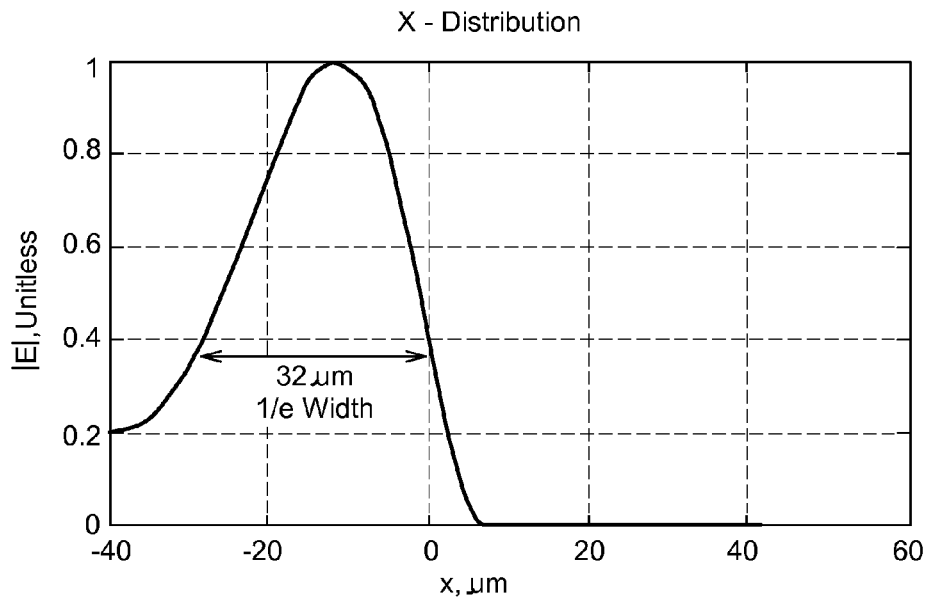
FIG. 10B is a graph showing the distribution of the magnitude of the optical energy, |E|, in the x-dimension for the design example of FIG. 10A.
Figure 10C:
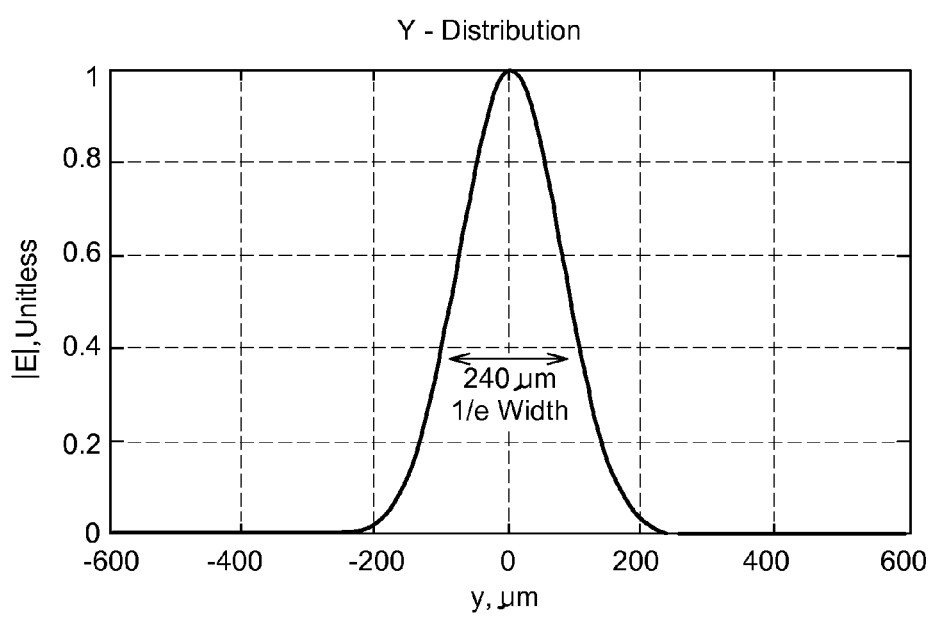
FIG. 10C is a graph showing the distribution of the magnitude of the optical energy, |E|, in the y-dimension for the design example of FIG. 10A.

FIG. 10A is a graph illustrating mode field distribution for an example of a simulated single-mode LMA fiber according to another embodiment. FIG. 10B shows the distribution of the magnitude of the optical energy, |E|, in the x-dimension, and FIG. 10C shows the distribution of the magnitude of the optical energy, |E|, in the y-dimension.

In this example, the fiber has the same dimensions as in Example 4. However, in this example, a glass cladding was used to provide the fiber with a numerical aperture of NA~0.26. The mode area is increased at 7680 µm². The fiber is still single-mode with M=1.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A single-mode large mode area (LMA) optical fiber that is helically coiled with a preselected bend radius, comprising:
   a core having a high aspect ratio elongated cross-section and having a first refractive index, wherein the core is narrower in a fast-axis direction and wider in a slow-axis direction, the core including an annular protrusion that is Gaussian in transverse cross-section, and wherein a width of the annular protrusion in the slow-axis direction, an annular extension of the annular protrusion in the fast-axis direction, and the bend radius are selected for single-mode operation; and
   a cladding surrounding the core, the cladding having a second refractive index different than the first refractive index.

2. The optical fiber of claim 1 wherein the core has a relatively large area selected so as to raise a threshold of stimulated Raman scattering or stimulated Brillouin scattering, or both.

3. The optical fiber of claim 1 wherein the annular extension of the annular protrusion in the fast-axis direction is in a range of approximately 2-6 µm.

4. The optical fiber of claim 3 wherein the bend radius is in a range of approximately 10-15 cm.

5. The optical fiber of claim 1 wherein a material of the core is one of quartz, fused silica, and doped glass.

6. The optical fiber of claim 5 wherein the cladding is glass.

7. The optical fiber of claim 1 wherein the fiber is configured to transmit a laser beam having a power greater than or equal to about 10 kW.

8. An optical fiber system comprising:
   a mandrill; and
   an optical fiber helically coiled about the mandrill with a preselected bend radius, the optical fiber including a core having a high aspect ratio elongated cross-section, wherein the core is narrower in a fast-axis direction and wider in a slow-axis direction, the core including an annular protrusion that is Gaussian in transverse cross-section and has a width in the slow-axis direction and an annular extension in the fast-axis direction, and wherein a ratio of the width, the annular extension, and the bend radius is selected for single-mode operation of the optical fiber.

9. The optical fiber system of claim 8 wherein the mandrill is metal.

10. The optical fiber system of claim 8 wherein the optical fiber further includes a cladding surrounding the core.

11. The optical fiber system of claim 10 wherein the core has a first refractive index and the cladding has a second refractive index, a difference between the first and second refractive indexes selected so as to achieve total internal reflection of at least one wavelength of light guided in the optical fiber.

12. The optical fiber system of claim 8 wherein a material of the core is one of quartz, fused silica, and doped glass.

13. The optical fiber system of claim 8 wherein the annular extension of the annular protrusion in the fast-axis direction is in a range of approximately 2-6 µm.

14. The optical fiber of claim 13 wherein the bend radius is in a range of approximately 10-15 cm.

* * * * *